(12) United States Patent
Dünninger et al.

(10) Patent No.: US 12,214,663 B2
(45) Date of Patent: Feb. 4, 2025

(54) INPUT ASSEMBLY WITH ACTIVE HAPTIC FEEDBACK AND BACKLIT DISPLAY REGION

(71) Applicant: Preh GmbH, Saale (DE)

(72) Inventors: Johannes Dünninger, OT Wittershausen (DE); Michael Jordan, Dipperz (DE)

(73) Assignee: Preh GmbH, Saale (DE)

( * ) Notice: Subject to any disclaimer, the term of this patent is extended or adjusted under 35 U.S.C. 154(b) by 581 days.

(21) Appl. No.: 17/442,309

(22) PCT Filed: Mar. 3, 2020

(86) PCT No.: PCT/EP2020/055512
§ 371 (c)(1),
(2) Date: Sep. 23, 2021

(87) PCT Pub. No.: WO2020/212008
PCT Pub. Date: Oct. 22, 2020

(65) Prior Publication Data
US 2022/0153137 A1 May 19, 2022

(30) Foreign Application Priority Data
Apr. 15, 2019 (DE) .......................... 102019109894.7

(51) Int. Cl.
*B60K 35/10* (2024.01)
*B60K 35/25* (2024.01)
(Continued)

(52) U.S. Cl.
CPC ............. *B60K 35/10* (2024.01); *G06F 3/016* (2013.01); *G06F 3/044* (2013.01); *B60K 35/25* (2024.01);
(Continued)

(58) Field of Classification Search
CPC .. H01H 2003/008; B60K 35/00; B60K 35/10; B60K 35/25; G06F 3/016; G06F 3/041
See application file for complete search history.

(56) References Cited

U.S. PATENT DOCUMENTS

2012/0080297 A1* 4/2012 Takeuchi ............... H01H 13/83
200/310
2017/0363803 A1* 12/2017 Nakamori ......... G02F 1/133314
(Continued)

FOREIGN PATENT DOCUMENTS

DE 102015010355 7/2016
DE 102015015417 A1 6/2017
(Continued)

OTHER PUBLICATIONS

International Search Report and Written Opinion of International Searching Authority for PCT/EP2020/055512, ISA/NL, Rijswijk, Netherlands, Dated: Jun. 4, 2020.
(Continued)

*Primary Examiner* — Priyank J Shah
(74) *Attorney, Agent, or Firm* — M&B IP Analysts, LLC

(57) ABSTRACT

The present disclosure relates to an input assembly including: a support, an input part, and at least one light source, wherein the input part has at least one input layer having an input surface intended to be touched by an operator, and a light guide for guiding light of the light source towards the display region for backlighting the latter, and wherein the light guide is disposed on the side of the input part facing away from the input surface, a touch-detection device for detecting a touch on the input surface by the operator and/or an actuation detection device for detecting an actuation of the input part by the operator, and an electromagnetic actuator for exciting a movement of the input part along the direction of movement by means of an electric control signal
(Continued)

in order to generate a haptic feedback, wherein the actuator includes an electromagnet.

14 Claims, 1 Drawing Sheet

(51) Int. Cl.
  *G06F 3/01* (2006.01)
  *G06F 3/044* (2006.01)
(52) U.S. Cl.
  CPC .............. *B60K 2360/1438* (2024.01); *B60K 2360/336* (2024.01); *B60K 2360/34* (2024.01)

(56) References Cited

U.S. PATENT DOCUMENTS

| | | | |
|---|---|---|---|
| 2018/0194229 A1* | 7/2018 | Wachinger | H03K 17/98 |
| 2018/0364806 A1* | 12/2018 | El-Ouardi | G06F 3/016 |
| 2019/0204920 A1* | 7/2019 | Lisseman | G06F 3/0414 |
| 2021/0237571 A1* | 8/2021 | Trapp | G06F 3/041 |
| 2022/0083157 A1* | 3/2022 | Shimizu | G06F 3/044 |
| 2022/0111418 A1* | 4/2022 | Takahashi | H02P 25/032 |

FOREIGN PATENT DOCUMENTS

| | | |
|---|---|---|
| DE | 102016002021 | 7/2017 |
| EP | 2633534 B1 | 3/2017 |

OTHER PUBLICATIONS

Wikipedia. "Backlight". May 29, 2019. https://de.wikipedia.org/w/index.php?title=Hintergrundbeleuchtung&oldid=189060150.

* cited by examiner

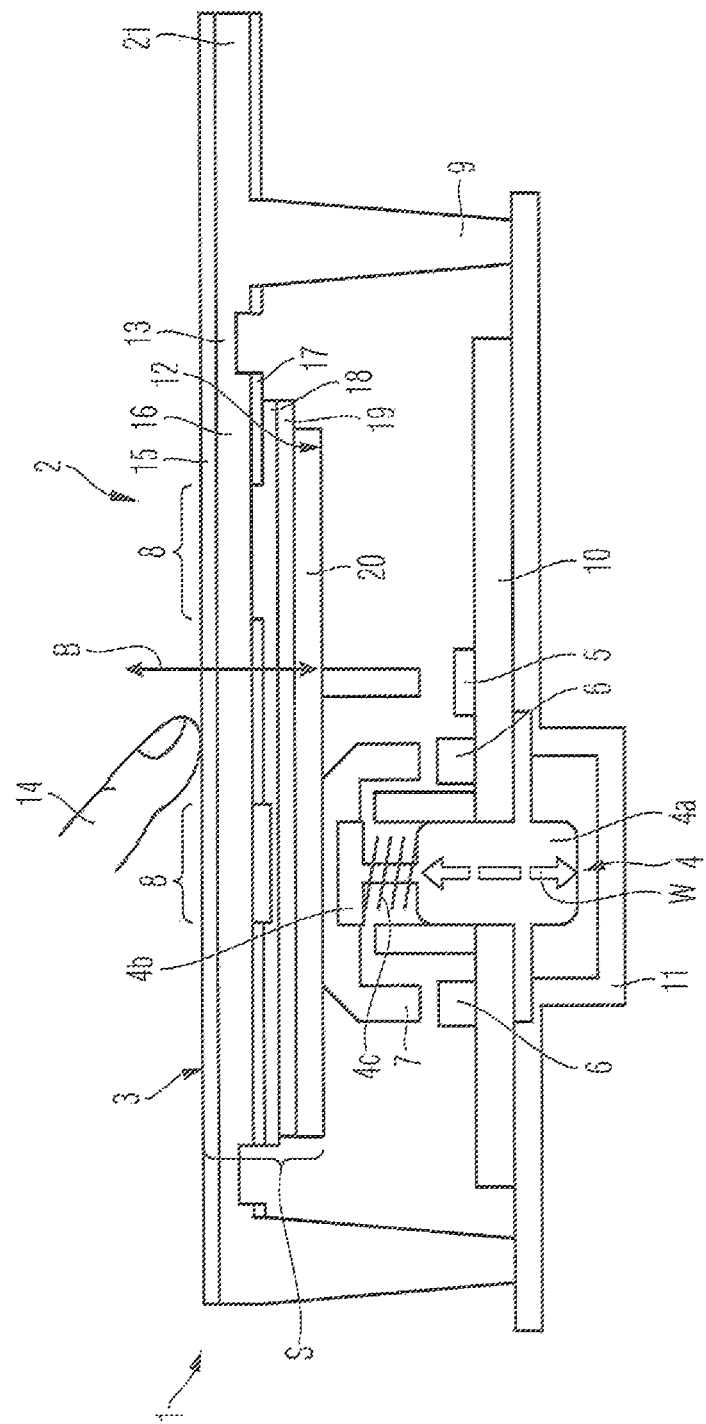

INPUT ASSEMBLY WITH ACTIVE HAPTIC FEEDBACK AND BACKLIT DISPLAY REGION

The present disclosure generally relates to an input assembly with an active haptic feedback. Generic input assemblies have a support and an input part, which is mounted on the support along at least one direction of movement by means of a mounting device capable of vibrating. In this case, the input part has an input surface intended to be touched by an operator and a touch-detection device for detecting a touch on the input surface by the operator, and/or an actuation detection device for detecting an actuation of the input part. An actuator for exciting a movement of the input part along the direction of movement by means of an electric control signal is also provided, in order to generate a haptic feedback for the operator. Typically, the haptic feedback, i.e. the application of the electric control signal to the actuator, is triggered by touching the input surface and/or the actuation of the input part if a predetermined minimum duration of the touch or a minimum actuating force applied during the touch is exceeded. Moreover, display region or display surfaces, which are to be backlit and which are to be backlit by means of one or several light guides, are regularly provided in the input parts. The display region is typically disposed in the center of the input surface. An excitation of movement of the input part that is as translational as possible most frequently requires the arrangement of the actuator in such a manner that the center of gravity is disposed on or at least close to the direction of action of the actuator. There is therefore the problem that a purely translational excitation and a uniform backlighting particularly in the center of the input surface, and in particular in the case of input parts with a comparatively flat configuration, are at odds from a construction standpoint.

The disclosed embodiments provide an input assembly in which these requirements, which are at odds from a construction standpoint, are met and in which, in particular, a solution saving construction space is provided. This object is achieved by an input assembly according to claim 1. Advantageous embodiments are in each case the subject matter of the dependent claims. An equally advantageous use is the subject matter of the independent use claim.

The operating assembly according to the present disclosure is a touch-sensitive input assembly generating a haptic feedback. Such a haptic feedback, which is generated by an actuator, is also referred to as an active haptic feedback. The input assembly according to the present disclosure comprises a support. The latter serves, for example, for fixing the input assembly on a trim or a vehicle body of a vehicle, particularly of a motor vehicle. The support may have a single-part or multi-part configuration.

The input assembly according to the present disclosure further comprises an input part, which is mounted on the support in a manner capable of vibrating along at least one direction of movement. The input part has an input layer, which has an input surface intended to be touched by an operator. According to the present disclosure, a touch-detection device for detecting a touch on the input surface by the operator or an actuation detection device for detecting an actuation of the input part or both are provided.

Touch detection may be designed in different manners; for example, it may be such a touch detection in which only the touch as such is detected, i.e. not in a spatially resolved manner, like a button with touch detection. However, devices detecting in a spatially resolving manner, such as a so-called touchpad or a so-called touchscreen, are to be included by the present disclosure, in which information relating to the touch location is outputted in addition to the touch detection result. Such touch-detection devices include an electrode structure for producing an array of measuring capacitances, for instance, the influence on which caused by a finger-touch is detected and thus provides the information on the location of the touch.

The input part according to the present disclosure has an input surface containing a display region to be backlit. For example, the display region is a display surface of an electronic pixel matrix display which almost completely fills the input surface, as it is used in a touchscreen, for example, or it is a display surface whose outline depicts a symbol or pictogram and which is formed from a transparent or translucent material, preferably a diffusely colored material, for example.

Further, according to the present disclosure, at least one light source and one light guide are provided for backlighting the display region with the light of the light source. According to the present disclosure, the light guide is provided on the side of the input part facing away from the input surface, preferably on the side facing towards the actuator. The light guide is formed from a translucent or transparent material.

In one configuration, the input part is formed by a layer structure, wherein the input layer forms an outer layer, which defines the input surface facing towards the operator. For example, the input layer is a see-through or translucent paint layer formed on a translucent or transparent PMMA substrate layer.

A mounting capable of vibrating is understood to be a mounting of the input part on the support in which the input part can be displaced from a rest position parallel to the direction of movement against a returning force, respectively, which acts so as to return the input part into a rest position. That means that a movement from and back into a rest position of the input part is caused by returning means that are provided, such as springs or elastically deformable portions in the transition zone between the support and the input part. For example, the direction of movement is oriented parallel to the input surface, preferably, the direction of movement is oriented orthogonally to the input surface.

According to the present disclosure, an actuator for exciting a movement of the input part along the direction of movement by means of an electric control signal is also provided, in order to generate, in the case of a touch and/or actuation by the operator, a haptic feedback for the operator by the latter being able to haptically perceive the movement of the input part. The light guide is in this case arranged in the direction of action of an excitation of movement by the actuator.

Preferably, the actuator is an electromagnetic transducer, i.e. the actuator comprises an electromagnet, to which the electric control signal is to be applied and which generates a magnetic field in the process and which is disposed on the support and optionally includes an iron core, as well as an armature, which cooperates with the magnetic field and is attached to the input part. In this case, the direction of action of the cooperation of the armature and the magnetic field is such that it substantially coincides with the direction of movement or is parallel thereto. The armature consists of a ferromagnetic material, for instance. Preferably, it is a plunger armature. An armature which is at least partially accommodated in a hollow volume surrounded by the coil of the electromagnet is understood to be a plunger armature. In another configuration, the armature consists of a permanently magnetic material, and the actuator is configured such that, when the control signal is applied to the electromagnet, a repulsive cooperation is the result and the connection between the light guide and the armature is thus not subjected to tensile stress. Preferably, the direction of action is orthogonal to the input surface; more preferably, the center of gravity of the input part lies on the direction of action of the actuator.

For example, the touch and/or actuation detection device for detecting a touch on the input surface or the actuation of the input part, which is provided according to the present disclosure, serves for triggering the haptic feedback, for example. As described above, this is a spatially resolving or non-spatially resolving touch-detection device, for example. For example, the touch is detected capacitively, resistively or inductively. Preferably, a actuation detection device is provided that includes a capacitively or optically detecting force sensor for measuring an actuating force acting on the input surface during the touch. For example, the haptic feedback is triggered depending on the measured actuating force.

According to the present disclosure, the light guide is disposed between the armature and the input layer defining the input surface, wherein the armature and the light guide are disposed, for example, directly adjacent to each other or preferably are connected to each other via an adhesive layer.

By arranging the light guide between the input layer and the armature, a uniform backlighting of the display region is obtained despite the actuator being disposed centrically or close to the center, or a placement of the display region in the center of the input surface is made possible in spite of the actuator control. Preferably, the armature is completely or partially embedded into the light guide. For example, the embedded state is achieved by the armature being overmolded with a thermoplastic material forming the light guide.

Preferably, the light guide is formed from a material with a modulus of elasticity in the range of from 1 to 1000 $N/mm^2$, preferably in the range of from 10 to 100 $N/mm^2$. In this manner, a mechanical and acoustic damping of the actuator and thus of the input assembly is obtained. The armature hitting against the electromagnet or the associated iron core, which is otherwise acoustically perceptible and mechanically possible, can be damped to such an extent that it is acoustically imperceptible in the solution according to the present disclosure.

Preferably, the material from which the light guide is formed is a thermoplastic elastomer, such as a urethane-based thermoplastic elastomer or a polyorganosiloxane, which is colloquially also referred to as silicone.

Preferably, the at least one light source whose light serves for backlighting the display surface is attached to the support. For example, the light source is disposed on a circuit board attached to the support. For example, the light source is arranged opposite a light-entry surface of the light guide, which is disposed parallel to the input surface. In another configuration, the light-entry surface is orthogonal to the input surface, so that in the case of a direction of movement orthogonal to the input surface, the distance between the light guide and the light source varies minimally or not at all during the generation of the haptic feedback.

According to a preferred configuration, the light guide is configured so as to reach over the actuator in a hood-shaped manner. For example, the light guide forms a peripheral edge, which protrudes towards the support and whose end surfaces serve for coupling in light at least in some portions.

According to a preferred configuration, a biased spring is disposed between the armature and the electromagnet, which biases the armature and the light guide against the input part; thus, an adhesive connection between the armature and the light guide can be omitted.

According to a preferred configuration, the input part has a constricted portion, e.g. a reduction of the layer thickness of one or several layers of the layer structure forming the input part, which surrounds the input surface, particularly the display region, in order to achieve a vibration-capable and thus elastically yielding mounting of the input part. For example, the reduction of the layer thickness is provided in the aforementioned substrate layer of the layer structure forming the input part. Preferably, the input assembly has a faceplate surrounding the input part and associated with the support, and the faceplate and the input part have at least one common component which integrally transitions from the faceplate into the input part, e.g. a substrate layer. For example, the constricted portion is incorporated into the substrate layer.

The present disclosure further relates to a use of the input assembly in any one of the above-described embodiments in a motor vehicle.

The following FIGURES additionally explain the various disclosed embodiments. The embodiment shown in the FIGURES is to be understood only as an example and merely represents a preferred embodiment. In the drawing:

FIG. 1 shows a schematic sectional view of an embodiment of the input assembly 1 according to the embodiment.

FIG. 1 schematically shows an embodiment of the input assembly 1 according to the embodiment. It has a support 9 on which an input part 2 is mounted by means of the mounting means 13 so as to be movable along a direction of movement B and so as to be elastically returning into a rest position. The input part 2 has a layer structure S consisting of several layers. An outer input layer 15 of the layer structure S facing towards the operator defines an input surface 3 intended for being touched and actuated by an operator 14. The input layer 15 is a transparent paint layer applied to a transparent PMMA substrate layer 16. The substrate layer 16 is not only a component of the input part 2, but is also a component of a faceplate 21 associated with the support 9, i.e. the substrate layer 15 transitions integrally from the input part 2 into the face plate 21, and, surrounding the input surface 3, a weakened-material portion or constricted portion of the substrate layer 15 is provided, which enables the vibration-capable mounting 13 of the input part 2 in the transition zone between the input part 2 and the faceplate 21.

The input part 2 has a masking 17 consisting of opaque paint which is partially removed by laser ablation in order to permit the transmission of light through display regions 8, which are situated within the input surface 3 and whose outline in each case corresponds to a symbol or pictogram. In the layer structure S, there follow, in the direction facing away from the operator 14, a transparent paint layer 18, a diffuser layer 19, and a film 20 with a coating 12 forming an electrode structure. The latter serves for capacitively detecting a touch on the input surface 3 by the operator. A cup-shaped light guide 7 is disposed adjacent to the film 12 associated with the layer structure S of the input part 2. This light guide 7 is formed from a transparent thermoplastic elastomer material and serves for guiding the light of several light sources 6 attached to the support 9 towards the backlit display regions 8. Via the end faces of the cup-shaped edge of the light guide 7, the light of the light sources 6 enters the former. The light sources 6 are LEDs with an SMD design, which are disposed on a circuit board 10 that is snapconnected with or screwed to, or the like, a rear cover 11 associated with the support 9.

The circuit board 10 further serves for electrically contacting an electromagnetic actuator 4. The latter has an electromagnet 4a and an armature 4b, which is configured as a plunger armature and abuts against the light guide 7; the light guide 7 is thus disposed between the armature 4b and the input part 2, in particular the film 20 thereof. The direction of action W is substantially directed in the direction B of movement or parallel to the direction B of movement. The armature 4a is biased towards the input part 2 by a spring 4c. An optical force sensor is provided as a actuation detection device 5, in addition to the touch-detection device 20 in the form of a film having an electrode structure 12. The touch and/or reaching a predetermined actuating force measured by the actuation detection device 5 triggers the initiation of a haptic feedback in the form of a movement of the input part 2 in the direction B of movement, which is caused by the actuator 5.

What is claimed is:

1. An input assembly comprising:
   a support,
   an input part mounted on the support along at least one direction of movement by means of a mounting device capable of vibrating, and
   at least one light source,
   wherein the input part has at least one input layer having an input surface intended to be touched by an operator,
   wherein the input surface contains a display region to be backlit, and
   the input assembly further has a light guide for guiding light of the light source towards the display region for backlighting the latter, and
   wherein the light guide is disposed on the side of the input part facing away from the input surface, and
   the input assembly further includes at least one of: a touch-detection device for detecting a touch on the input surface by the operator and an actuation detection device for detecting an actuation of the input part by the operator, and
   an actuator for exciting a movement of the input part along the direction of movement by means of an electric control signal in order to generate a haptic feedback,
   wherein the light guide is case arranged in the direction of action of an excitation of movement by the actuator;
   wherein the light guide is formed from a material with a modulus of elasticity in a range of from 1 to 1000 N/mm$^2$, and
   wherein the input part has a constricted portion surrounding the input surface so that the input surface is mounted in an elastically yielding manner so that the input part is vibration-capable.

2. The input assembly according to claim 1, wherein the actuator is an electromagnetic actuator that includes an electromagnet, to which the electric control signal is to be applied and which generates a magnetic field in the process and which is disposed on the support, as well as an armature supported on or attached to the input part, and the magnetic field and the armature cooperate along a direction of action pointing substantially in the direction of movement, wherein the light guide is disposed between the input part and the armature.

3. The input assembly according to claim 2, wherein the armature and the light guide are disposed directly adjacent to each other.

4. The input assembly according to claim 2, wherein a biased spring is disposed between the armature and the electromagnet, and the biased spring biases the armature and the light guide against the input part.

5. The input assembly according to claim 2, wherein the armature is at least partially embedded in the light guide.

6. The input assembly according to claim 2, wherein the armature and the light guide are connected to each other via an adhesive layer.

7. The input assembly according to claim 1, wherein the material of the light guide is a thermoplastic elastomer, wherein the thermoplastic elastomer is any one of: urethane-based thermoplastic elastomer and a polyorganosiloxane.

8. The input assembly according to claim 1, wherein the direction of action is perpendicular to the input surface.

9. The input assembly according to claim 1, wherein a center of gravity of the input part is disposed on the direction of action of the actuator.

10. The input assembly according to claim 1, wherein the at least one light source is attached to the support.

11. The input assembly according to claim 1, wherein the light guide is configured so as to reach over the actuator in a hood-shaped manner.

12. The input assembly according to claim 1, wherein the actuation detection device includes a capacitively or an optically detecting force sensor for measuring an actuating force acting on the input surface during the touch.

13. The input assembly according to claim 1 is used in a motor vehicle.

14. An input assembly comprising:
    a support,
    an input part mounted on the support along at least one direction of movement by means of a mounting device capable of vibrating, and
    at least one light source,
    wherein the input part has at least one input layer having an input surface intended to be touched by an operator,
    wherein the input surface contains a display region to be backlit, and
    the input assembly further has a light guide for guiding light of the light source towards the display region for backlighting the latter, and
    wherein the light guide is disposed on the side of the input part facing away from the input surface, and
    the input assembly further includes at least one of: a touch-detection device for detecting a touch on the input surface by the operator and an actuation detection device for detecting an actuation of the input part by the operator, and
    an actuator for exciting a movement of the input part along the direction of movement by means of an electric control signal in order to generate a haptic feedback,
    wherein the light guide is in this case arranged in the direction of action of an excitation of movement by the actuator;
    wherein the actuator is an electromagnetic actuator that includes an electromagnet, to which the electric control signal is to be applied and which generates a magnetic field in the process and which is disposed on the support, as well as an armature supported on or attached to the input part, and the magnetic field and the armature cooperate along a direction of action pointing substantially in the direction of movement, wherein the light guide is disposed between the input part and the armature;

wherein a biased spring is disposed between the armature and the electromagnet, and the biased spring biases the armature and the light guide against the input part;

wherein the light guide is cup-shaped; and wherein the input part has a constricted portion surrounding the input surface so that the input surface is mounted in an elastically yielding manner so that the input part is vibration-capable.

* * * * *